United States Patent

Sturza et al.

[11] Patent Number: 6,157,642
[45] Date of Patent: Dec. 5, 2000

[54] CODING SYSTEM AND METHOD FOR LOW-EARTH ORBIT SATELLITE DATA COMMUNICATION

[75] Inventors: Mark A. Sturza, Encino, Calif.; Farzad Ghazvinian, Mercer Island, Wash.; Sami M. Hinedi, Bellevue, Wash.; Karl R. Griep, Seattle, Wash.; Samson Million, Kirland, Wash.

[73] Assignee: Teledesic LLC, Bellevue, Wash.

[21] Appl. No.: 08/949,412

[22] Filed: Oct. 14, 1997

[51] Int. Cl.$^7$ .......................... H04B 7/185; H04B 7/216; H04L 12/28

[52] U.S. Cl. .......................... 370/389; 370/316; 370/441

[58] Field of Search .................................... 370/312, 316, 370/326, 395, 342, 389, 392, 465, 468, 335, 320, 441, 479, 208, 209; 714/752, 755; 375/205, 208, 209, 210

[56] References Cited

U.S. PATENT DOCUMENTS

| | | |
|---|---|---|
| 5,117,427 | 5/1992 | Miyake et al. |
| 5,408,237 | 4/1995 | Patterson et al. |
| 5,446,747 | 8/1995 | Berrou |
| 5,473,601 | 12/1995 | Rosen et al. |
| 5,600,653 | 2/1997 | Chitre et al. ............................ 370/395 |
| 5,734,962 | 3/1998 | Hladik et al. ............................ 370/342 |
| 5,778,139 | 7/1998 | Kim ........................................ 386/81 |

FOREIGN PATENT DOCUMENTS

| | | |
|---|---|---|
| 0 650 271 A2 | 4/1995 | European Pat. Off. |
| 0 782 291 A2 | 7/1997 | European Pat. Off. |

OTHER PUBLICATIONS

J. Lunsford et al., "Link Enhancement for ATM Over Satellite Links," Proceedings of the Tenth International Conference on Digital Satellite Communications, Brighton, UK, May 1995, pp.129–136.

*Primary Examiner*—Chi H. Pham
*Assistant Examiner*—Brenda H. Pham
*Attorney, Agent, or Firm*—Christensen O'Connor Johnson Kindness PLLC

[57] ABSTRACT

A data communication system for a constellation of low-Earth orbit (LEO) satellites (13a, 13b, ...) that employ Earth-fixed cellular beam management technology is disclosed. The data to be communicated is formed into data packets by a transmitting ground terminal (41). Each data packet includes a header (41) and a payload (43). The header (41) contains address and other control information and the payload (43) contains the data to be communicated. The header and payload databits are separated (71) and outer forward error correction (FEC) encoded (72, 73) with an outer error correction code. The symbols of the outer encoded header and payload codewords are interleaved, first separately (74, 75) and then together (76). The outer encoded, interleaved header and payload codewords are inner encoded by an inner FEC encoder (77). Upon receipt by an uplink satellite (63), the inner error correction code is removed (87) and the resulting codeword symbols are de-interleaved (88, 89, 90). The outer error correction code of the header portion is then removed (91) to recover the header of the original signal. The information contained in the header is used to route the data packets through the satellite constellation to the appropriate downlink satellite (93). The downlink satellite re-outer encodes the header (95) and the symbols of the re-outer encoded header and the still outer encoded payload codewords are separately interleaved (96, 97) and then interleaved together (98). The interleaved re-outer encoded header and outer encoded payload databits are re-inner encoded (99). Upon receipt by a receiving ground terminal (107), the data packets are inner decoded (111) to remove the inner error correction code and the symbols of the header and payload codewords are de-interleaved (112, 113, 114). Then the header and payload codewords are outer decoded (115, 116) to remove the outer error correction codes and recover the header and payload. Preferably a payload filter (117) is included to eliminate the need to outer decode payload codewords not destined for the receiving ground terminal (107).

28 Claims, 9 Drawing Sheets

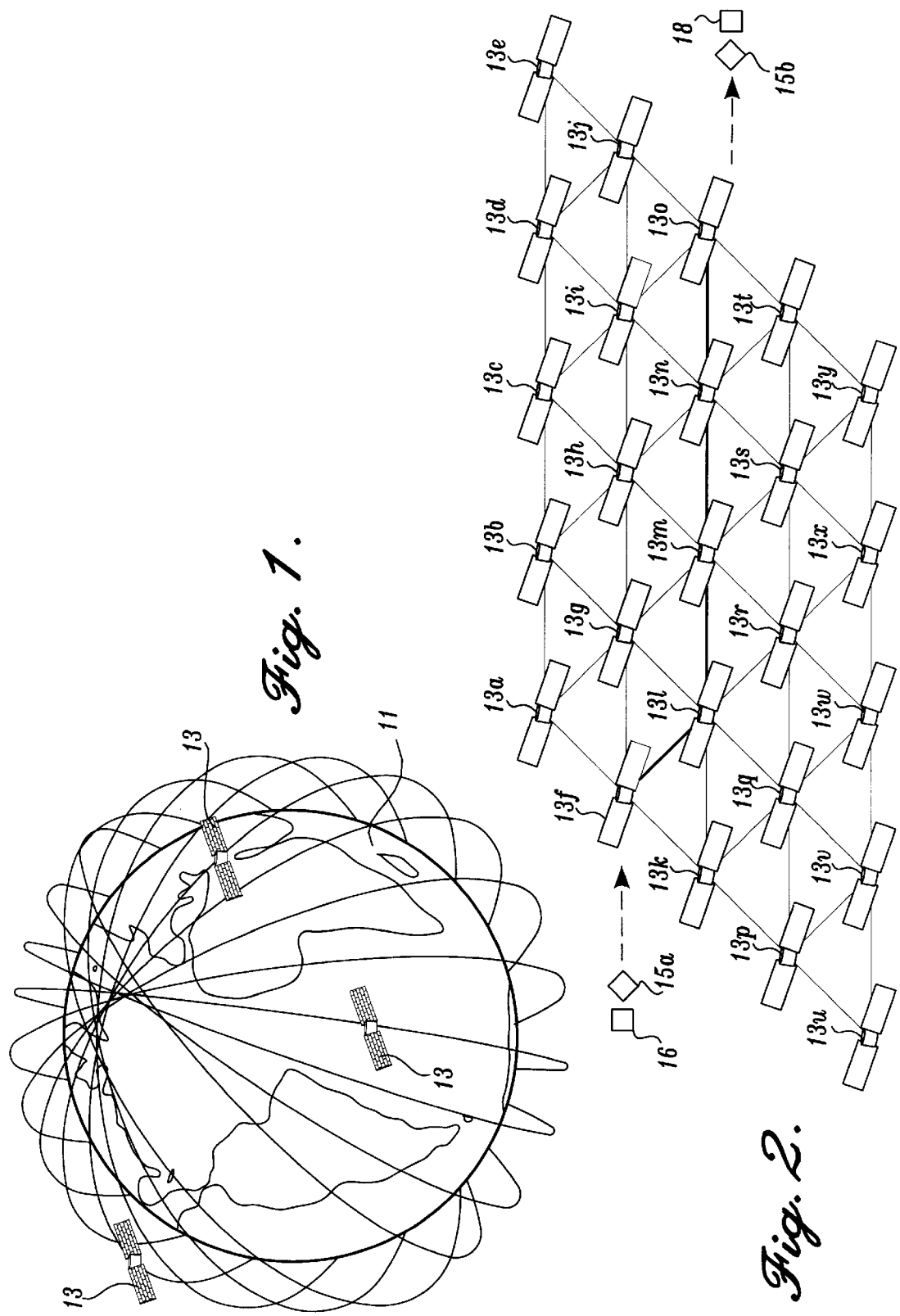

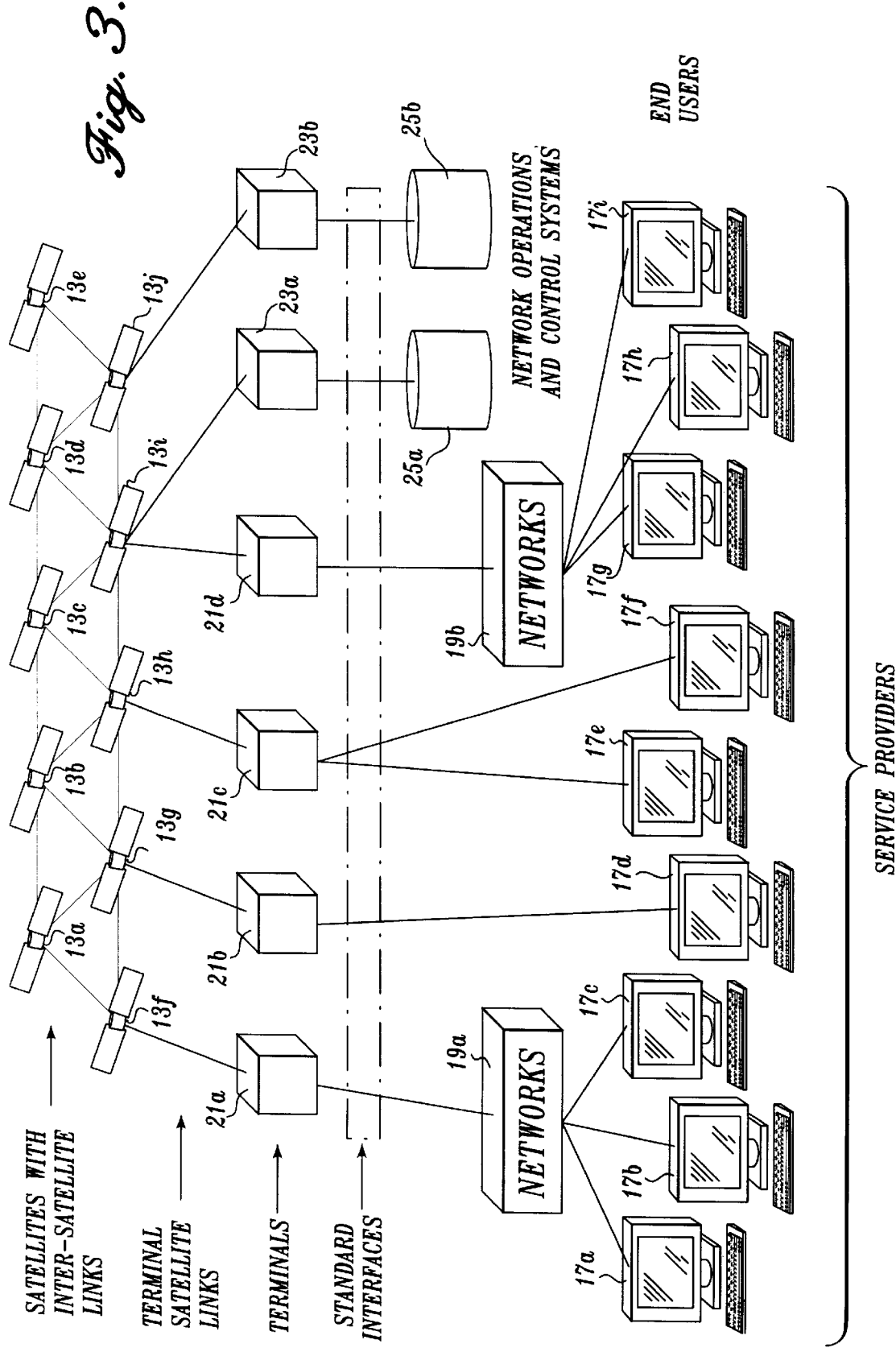

CODING SYSTEM AND METHOD FOR LOW-EARTH ORBIT SATELLITE DATA COMMUNICATION

FIELD OF THE INVENTION

This invention relates to data communication systems and, more particularly, to digital satellite data communication systems.

BACKGROUND OF THE INVENTION

In recent years the need for global data networking capability has rapidly expanded. In order to meet this need, broadband satellite communication systems have been proposed as an alternative to land-based communication systems. One type of satellite data communication system is described in a variety of U.S. patents assigned to the assignee of this patent application, including U.S. Pat. Nos. 5,386,953; 5,408,237; 5,527,001; 5,548,294; 5,641,135; 5,642,122, and 5,650,788. These patents and other pending applications assigned to the assignee of this patent application describe a satellite communication system that includes a constellation of low-Earth orbit (LEO) satellites that implement an Earth-fixed cellular beam approach to transmitting data from one location on the Earth's surface to another location. More specifically, each LEO satellite has a communication "footprint" that covers a portion of the Earth's surface as a satellite passes over the Earth. The communication footprint defines the area of the Earth within which ground terminals can communicate with the satellite. Located within each footprint are a large number of cells. During the period of time a cell remains within the borders of a satellite footprint, ground terminals located in the cell transmit data to and receive data from the "servicing" satellite. When a satellite reaches the end of its servicing arc, another satellite in orbit is positioned to "service" each Earth-fixed cell previously covered by the satellite reaching the end of its servicing arc. During servicing, the antennas of ground terminals located in the cells continuously point toward the servicing satellite as it moves in orbit and antennas on the satellite point toward the cells during the time period within which the ground terminals in the cells are allowed to transmit data. Other LEO satellite communication systems employ a satellite-fixed beam approach to transmitting data from one location on the Earth's surface to another location.

Regardless of the nature of the LEO satellite communication system, Earth-fixed cell or satellite-fixed beam, data to be sent from one location on the Earth to another location is transmitted from a ground terminal located within a cell to the satellite serving the cell via an uplink data channel. The data is routed through the constellation of LEO satellites to the satellite serving the cell within which the ground terminal of the designated receiver is located. The latter satellite transmits the data to the receiver ground terminal via a downlink data channel. Thus, the constellation of LEO satellites and the ground terminals form a satellite data communication network wherein each ground terminal and satellite forms a node of the network.

In order for an LEO satellite data communication system to be competitive, it must have a wide bandwidth and be of relatively low cost. Low cost requires that the satellites be light in weight and relatively inexpensive to manufacture. One way of keeping satellite weight and cost low is to minimize the complexity of electronic signal processing hardware, and keep data transmission and reception power requirements low. Unfortunately, low data transmission and reception power conflicts with the need for a highly reliable data communication system because it is relatively easy to lose data contained in low-power signals. One way of improving the reliability of low-power data communication signals that is well known in the satellite communication field is to forward error correction (FEC) code the data to be transmitted. See U.S. Pat. Nos. 5,117,427; 5,446,747; and 5,473,601 for examples of FEC coding of digital data signals.

The present invention is directed to an LEO satellite data communication system that uses FEC coding in a novel way to minimize power requirements and maximize reliability.

SUMMARY OF THE INVENTION

In accordance with this invention a low-Earth orbit (LEO) satellite data communication system is provided. Data to be transmitted from one location on the Earth to another location is assembled into digital data packets each of which includes a header and a payload. The header includes address and other control information, and the payload contains the information to be transmitted. A sending ground terminal first separately encodes the header and payload with a suitable outer forward error correction (FEC) code. The symbols of the resulting header and payload codewords are interleaved. The interleaved header and payload codewords are inner encoded using a suitable FEC code. The thusly concatenated coded, interleaved data packets are transmitted to a receiving satellite via an uplink data communication channel. The receiving satellite first decodes the concatenated coded, interleaved data packets to remove the inner FEC code. Then the symbols of the resulting interleaved header and payload codewords are de-interleaved to regenerate the outer encoded header and payload codewords. The header codewords are then further decoded to remove the outer encoding and recover the header bits of each data packet. The recovered header information is used to route the data packets through the satellite constellation to the appropriate sending satellite. The sending satellite re-outer encodes the header using a suitable outer FEC code. The symbols of the thusly re-outer encoded header codewords are then interleaved with the symbols of the still outer encoded payload codewords and the interleaved header and payload codewords are re-inner encoded using a suitable inner FEC code. The re-concatenated coded, interleaved data packets are transmitted to a receiving ground terminal via a downlink data communication channel. The receiving ground terminal first decodes the re-concatenated coded, interleaved databits to remove the inner FEC code. The symbols of the outer encoded header and payload codewords are then de-interleaved. Finally, the header and payload codewords are decoded and the data packets recovered.

In accordance with other aspects of this invention, prior to the symbols of the header and payload codewords being interleaved together by the sending ground terminal, the symbols of the header and payload codewords are separately interleaved. Further, after the symbols of the header and payload codewords are de-interleaved by the receiving satellite, prior to the header codewords being decoded, the symbols of the header codewords are de-interleaved.

In accordance with still other aspects of this invention, prior to the symbols of the header and payload codewords being interleaved by the sending satellite, the symbols of the header codewords are separately interleaved.

Further, after the symbols of the header and payload codewords are de-interleaved by the receiving ground terminal, prior to the symbols of the header and payload codewords being decoded, the symbols of the header and payload codewords are separately de-interleaved.

In accordance with further other aspects of this invention, prior to the symbols of the payload codewords being decoded by the receiving ground terminal, a payload filter controlled by the header decides if data packets are destined for the receiving ground terminal. Only the symbols of payload codewords of data packets destined for the receiving ground terminal are outer decoded. The symbols of payload codewords of data packets not destined for the receiving ground terminal are not outer decoded. They are rejected.

In accordance with further aspects of this invention, the outer forward error correction code is, preferably, a Reed-Soloman (RS) or a Bose, Chaudhuri and Hocquenghem (BCH) code.

In accordance with still further aspects of this invention, the inner forward error correction code is a turbo code, such as a serial or parallel concatenated convolution code (SCCC or PCCC) or a hybrid concatenated convolutional code (HCCC). Other suitable codes are a convolutional code, block code or trellis code.

In accordance with yet further aspects of this invention, the chosen inner code is punctured, depending on uplink and downlink requirements.

In accordance with yet other further aspects of this invention, the header bits of data packets routed through the satellite constellation are encoded and combined with their related outer encoded payload bits by each sending satellite in the route and decombined and decoded by each receiving satellite in the route.

As will be readily appreciated from the foregoing description, the invention provides a switched packet data communication system that employs concatenated codes and header and payload interleaving that is ideally suited for use in a low-Earth orbit (LEO) satellite system. Because only the header is decoded at the satellite, as opposed to both the header and the payload being decoded at the satellite, satellite hardware and power requirements are substantially lowered without loss of the reliability benefits of concatenated error correction coding. Further, because the payload outer FEC code is only applied and removed at the ends of the transmission path, the coding gain required of the inner FEC code is substantially lessened. Embodiments of the invention that employ a payload filter at the receiving ground terminal provide added benefits by eliminating unnecessary decoding.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a pictorial diagram showing the orbital paths of the satellites of a constellation of low-Earth orbit (LEO) satellites positioned to cover the entire surface of the Earth;

FIG. 2 is a plan view of a portion of the constellation of LEO satellites depicted in FIG. 1;

FIG. 3 is a pictorial view showing the various signal paths to and from a constellation of LEO satellites of the type depicted in FIGS. 1 and 2;

DETAILED DESCRIPTION OF THE PREFERRED EMBODIMENT

Figure 4:
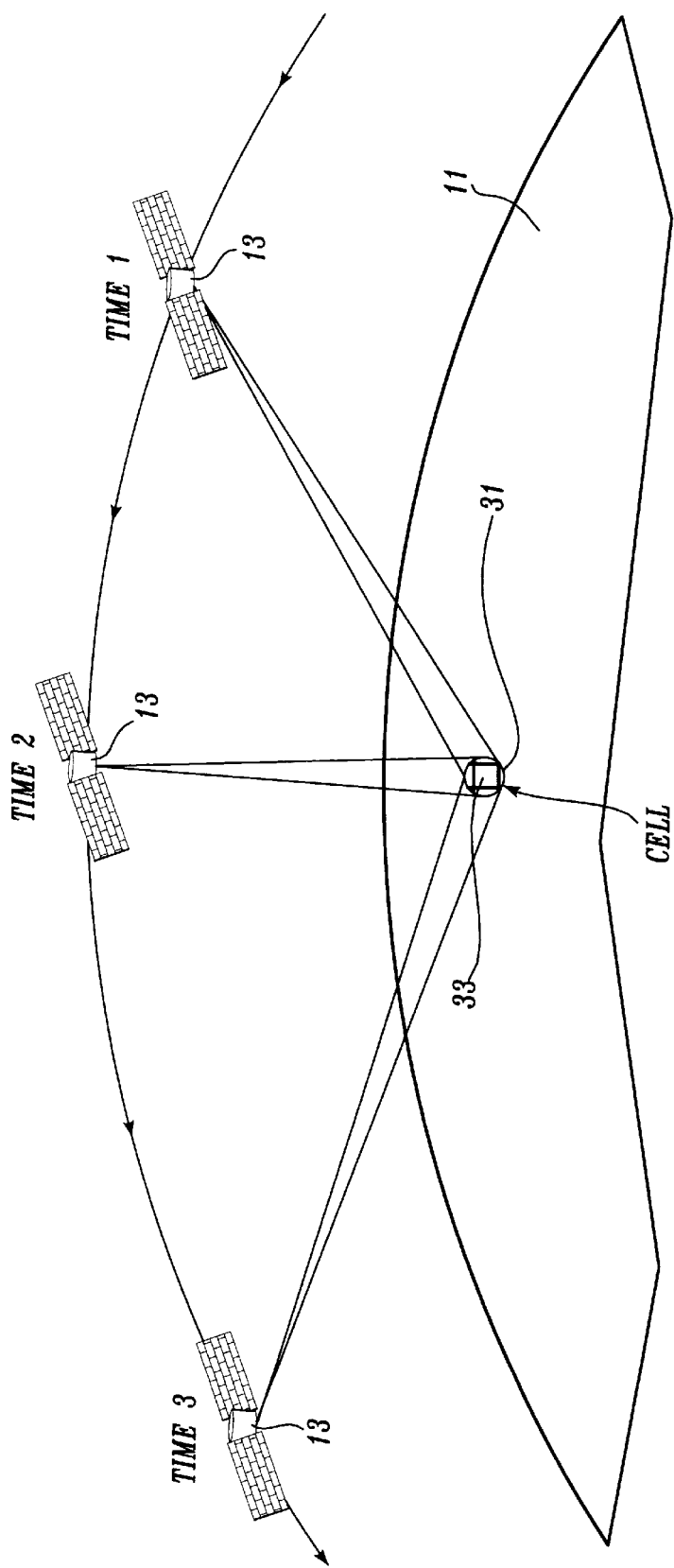
FIG. 4 is a pictorial view that shows a single LEO satellite flying over a single Earth cell in three sequential positions.

The present invention is directed to a data communication system that is ideally suited for use in a low-Earth orbit (LEO) satellite communication network. An LEO satellite communication network includes a constellation of satellites orbiting the Earth such that a majority of the Earth is within the view of at least one satellite at any point in time. One proposed LEO satellite communication network employs 288 satellites, plus spares, located in 12 polar orbit planes. Each plane includes 24 satellites at an altitude of approximately 1,350 kilometers. The path of travel of the satellites of such a network is generally depicted in FIG. 1. More specifically, FIG. 1 depicts the Earth 11 surrounded by a plurality of rings that depict the orbital planes of a plurality of satellites 13.

FIG. 2 illustrates a number of the satellites 13a, 13b, 13c . . . that make up the constellation of satellites included in an LEO satellite communication network of the type illustrated in FIG. 1. The satellites are shown closer to one another for illustrative purposes only. As shown in FIG. 2, a data signal 15a, consisting of one or more data packets, is transmitted on an uplink data communication channel by a ground terminal 16 and received by a first satellite 13f that forms part of the constellation of satellites. The data packets are routed through the constellation of satellites. The routing path is dependent on network traffic. For example, the receiving or uplink satellite may forward the one or more data packets to a second satellite 13l, which forwards the data packets to a third satellite 13m, which forwards the data packets to a fourth satellite 13n. The routing continues until the data packets reach the satellite 13o associated with the ground terminal 18 that is to receive the data packets. This satellite, called the sending or downlink satellite, transmits the data packets as a data signal 15b to the receiving ground terminal 18. The receiving ground terminal forwards the data to an end user. It is to be understood that the data packets of a message may be routed through different paths in the constellation of satellites and may arrive at the ground terminal in a different order than they were sent. In this case, upon receipt at the ground terminal the data packets are re-ordered in the correct order before data is forwarded to the end user.

FIG. 3 further illustrates the LEO satellite communication network. End users 17a, 17b, 17c . . . are connected either through networks 19a and 19b . . . , or directly, to ground terminals 21a, 21b, 21c . . . . The networks 19a, 19b, . . . may, for example, be conventional switched public telephone system networks, corporate networks or other proprietary networks.

Network operations and control systems 25a and 25b are shown as communicating with the satellites via separate terminals 23a and 23b. All of the ground terminals are designed to transmit signals to and receive signals from the constellation of satellites via uplink and downlink data channels. Since LEO satellites, in contrast to geosynchronous satellites, move with respect to the Earth, the region of the Earth covered by a satellite's footprint is also constantly moving. Preferably, the LEO satellite communication network of the present invention employs Earth-fixed cellular beam technology. In an Earth-fixed cellular beam system the surface of the Earth is mapped with a number of cells. As an LEO satellite passes over the Earth, the satellite's antennas are controlled so that the beams of the antennas are steered to remain pointed at the center of each cell located within a satellite's footprint. For a predetermined period of time, the cells located within the satellite's footprint are therefor served by the same satellite as the satellite moves in orbit over the cell. In contrast, conventional LEO satellites use a satellite-fixed beam approach in which the direction of the beams from the satellite are fixed with respect to the satellite, i.e., the beams are not steered. Although the present invention is applicable to a satellite-fixed beam as well as Earth-fixed cellular systems, an Earth-fixed cellular satellite communication system is preferred because it is believed to substantially reduce communication problems when compared to other systems.

An Earth-fixed cellular beam system is illustrated in FIG. 4. As a satellite moves in orbit with respect to the Earth, the cells located within a footprint defined by the satellite's antennas are continuously serviced by the satellite. As shown, at the beginning of the arc, at a time 1, the boundary 31 of the beam of one of the antennas of the satellite 13 covers a cell 33. At a time 2, midway in the arc, the beam from the same or another antenna is electronically or mechanically steered so that the cell is still covered by the beam. At the end of the arc, at a time 3, the beam of the antenna from the same satellite still covers the cell 33. Since the satellite antenna beams are steered to cover the cell 33 from time 1 to time 3, the cell with respect to the satellite and the Earth is "fixed." Prior to time 1, the antenna of another (upstream) satellite covered the cell 33. At time 3, the antenna of a further (downstream) satellite will begin covering the cell 33. Rather than servicing a single cell, a satellite antenna beam can be electronically controlled to serve a group of cells by hopping from cell to cell located within a predetermined grid, if desired. When a servicing satellite moves out of range, the appropriate antenna of the succeeding satellite picks up the prior cells and the antennas of that satellite point at the cells from time 1 to time 3 as the satellite moves through its servicing arc. The size of the satellite footprints is such that all regions of the Earth are covered at all points in time.

Figure 5:
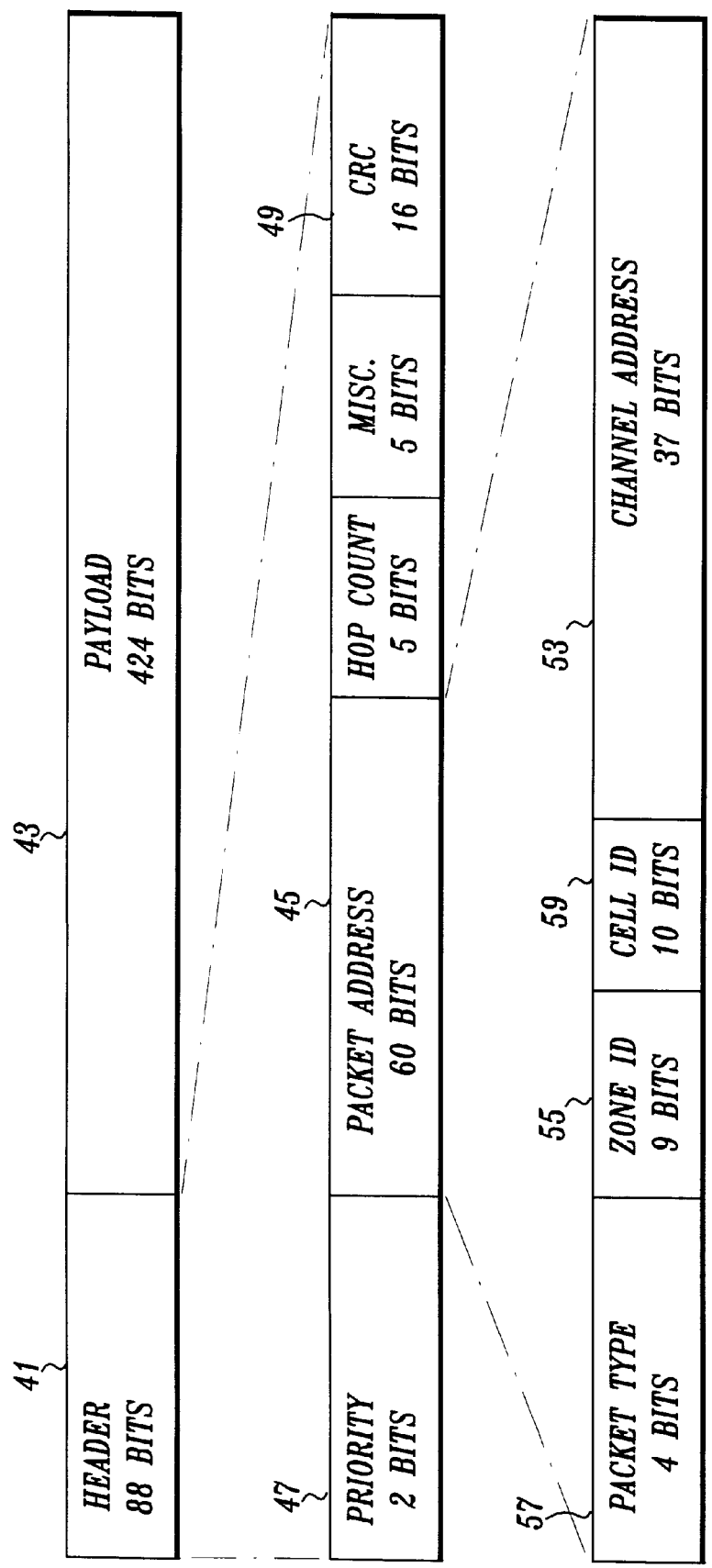
FIG. 5 illustrates a data packet of the type employed by an LEO satellite data communication system formed in accordance with the invention.

Rather than each data message being continuously transmitted, as is well known in the cellular telephone communication and other arts, data transmissions are broken into digital data "packets." As illustrated in FIG. 5, each packet includes a header 41 and a payload 43. The number of databits in the header are substantially fewer than the number of databits in the payload. In the illustrated example, the header contains 88 databits, and the payload contains 424 databits. The illustrated header includes packet address bits 45 as well as other bits, such as priority bits 47, cyclic redundancy check (CRC) bits 49, etc. The packet address bits may include, for example, channel address bits 53, zone ID bits 55, packet type bits 57, and cell ID bits 59. As will be appreciated by those skilled in the art of telecommunications and others, FIG. 5 illustrates merely one example of many, many possible header and payload databit relationships.

As will be readily appreciated from the foregoing description, the header bits, in essence, contain address and control information designed to direct the data packets through the satellite constellation to a desired ground terminal. The payload, of course, contains the information being transmitted. At the receiving ground terminal the packets of received data, which may be received out of order, are reassembled in the appropriate sequential manner prior to being forwarded to an end user.

The present invention is directed to a method and apparatus for transmitting data packets of the type illustrated in FIG. 5 through an LEO satellite communication system of the type illustrated in FIGS. 1–4 in a way that enhances reliability while minimizing power consumption. This is accomplished by using concatenated coding techniques and interleaving the header and payload databits.

As will be better understood from the following discussion, concatenated coding is accomplished by first separately forward error correction (FEC) coding the header and payload databits. The outer error correction coding is accomplished by conventional FEC encoders such as a Reed-Soloman (RS) or Bose, Chaudhuri and Hocquenghem (BCH) encoder. Then the symbols of the header and payload codewords resulting from the outer encoding are interleaved. Preferably, the symbols of the header and payload codewords are first separately interleaved. Then the separately interleaved header and payload symbols are interleaved together. Thereafter, the interleaved codewords are again FEC coded. This inner error correction coding is accomplished by another conventional FEC encoder. A suitable inner encoder is a turbo encoder, such as a parallel, serial or hybrid concatenated convolution coder (PCCC, SCCC and HCCC). Suitable alternatives are convolutional, block and trellis encoders. If desired, the encoded signal may be punctured, depending on the requirements of the link. After encoding, the concatenated coded, interleaved data packet is modulated and the modulated signal is transmitted via an uplink data channel to the satellite in the LEO satellite constellation serving the cell within which the transmitter lies.

The satellite receiving the uplinked data demodulates the received signal and applies it to an inner decoder. The inner decoder decodes the concatenated coded, interleaved data packets and recovers the interleaved, outer encoded header and payload codewords. The symbols of the interleaved, outer encoded header and payload codewords are de-interleaved, resulting in the recovery of the outer encoded header and payload codewords. The outer encoded header codewords are decoded by a header outer decoder, resulting in the recovery of the original header data. The payload codewords are not decoded. The thusly extracted header data is used to route the data packets through the LEO satellite constellation to the satellite serving the cell within which the receiving ground terminal is located. This sending satellite re-outer encodes the header data by passing the header data through a conventional FEC encoder that may be similar to, or different from, the one used on the uplink. Thereafter, the symbols of the re-outer encoded header codewords and the still outer encoded payload codewords are interleaved. Preferably, the symbols of the header and payload codewords are first separately interleaved, then the separately interleaved header and payload symbols are interleaved together. The interleaved codewords are re-inner encoded. Again, this is accomplished by a conventional FEC encoder, such as a turbo encoder. The thusly re-concatenated coded, interleaved data packets are modulated and transmitted to the receiving ground terminal via a downlink data channel.

The receiving ground terminal demodulates the received signal and applies the demodulated signal to an inner decoder. The inner decoder decodes the re-concatenated coded, interleaved data packets, recovering the outer encoded, interleaved header and payload codewords. The symbols of the interleaved, outer encoded header and payload codewords are de-interleaved, resulting in the recovery of the re-outer encoded header codewords and the outer encoded payload codewords. The recovered re-outer encoded header and outer encoded payload codewords are separately decoded by a header outer decoder and a payload outer decoder, resulting in the recovery of the header data and the original payload data. Preferably, the re-outer encoded header codewords are decoded before the outer encoded payload codewords are decoded. The header data is used to control a filter that rejects payload codewords of data packets not destined for the receiving ground terminal. Information contained in the header data is used to reassemble, in the appropriate order, the payload data contained in a plurality of packets prior to the payload data being forwarded to an end user.

Figure 6:
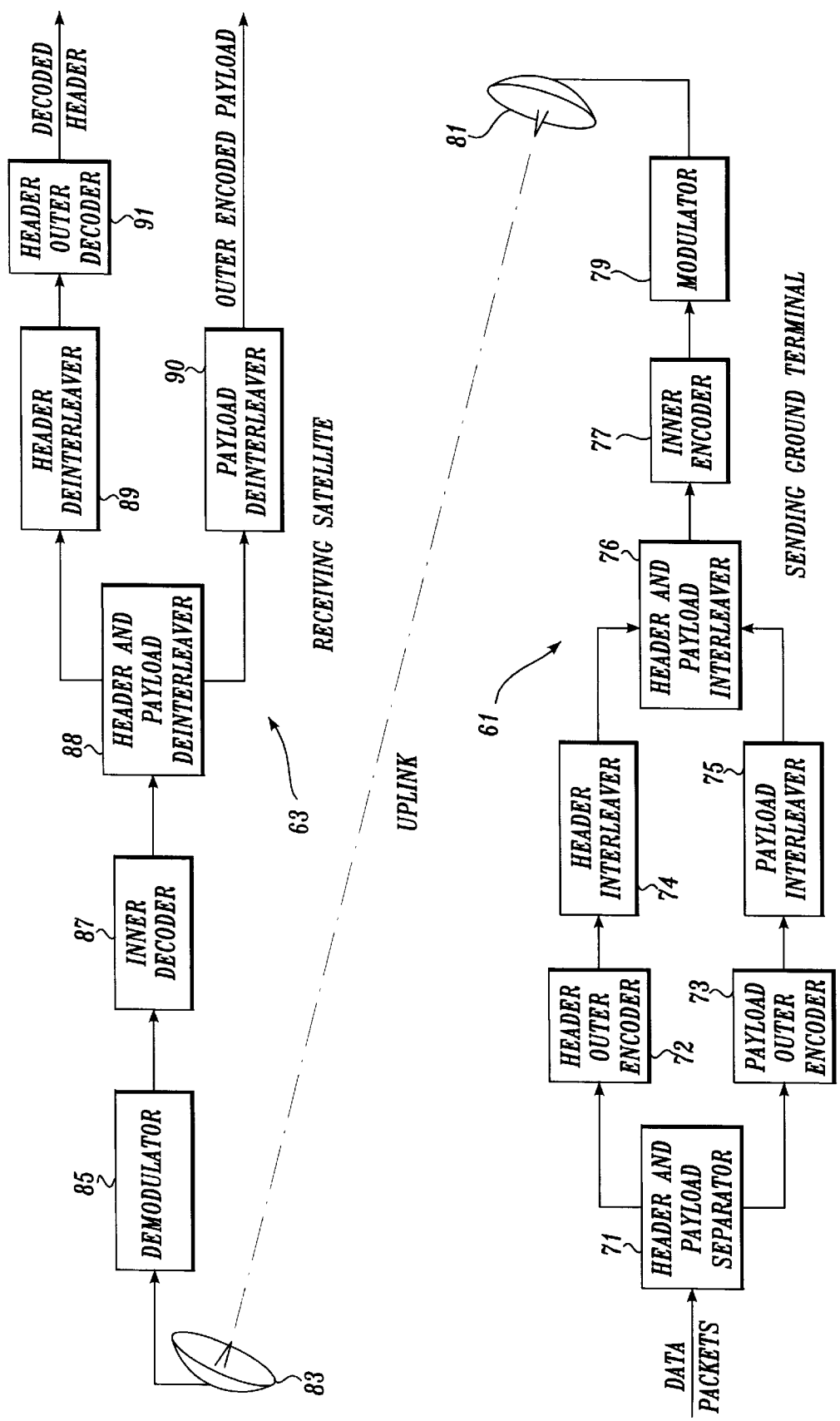
FIG. 6 is a functional block diagram that illustrates the uplink components of an LEO satellite data communication system formed in accordance with the invention.

Returning to the drawings, FIG. 6 is a functional block diagram illustrating the major components of the sending ground terminal 61 and the receiving satellite 63 involved in the uplink of the presently preferred embodiment of the invention. The sending ground terminal 61 includes a header and payload separator 71, a header outer coder 72, a payload outer encoder 73, a header interleaver 74, a payload interleaver 75, a header and payload interleaver 76, an inner encoder 77, a modulator 79, and an antenna 81. One or more data packets are applied to the header and payload separator, which separates the packets into header databits and payload databits. See FIG. 5. The header databits are FEC coded by the header outer encoder 72. As noted above, suitable header outer encoders are encoders and BCH encoders. Likewise, the payload databits are FEC coded by the payload outer encoder 73. As with the header outer encoder 51, the payload outer encoder 53 is a conventional FEC encoder, such as an RS or BCH encoder. Obviously, the header and outer encoders must be compatible.

The header and payload outer encoders produce header and payload codewords. The symbols of the header and payload codewords can relate to a single header, or can be the result of encoding several headers and payloads. Regardless of whether they are derived from a codeword related to a single packet or a plurality of codewords related to a plurality of packets, the symbols of the header and payload codewords are separately interleaved by the header and payload interleavers 74 and 75, respectively.

The symbols of the separately interleaved header and payload codewords are interleaved by the header and payload interleaver 76. Interleaving the symbols of the header and payload codewords has several advantages. First, it reduces the complexity of the header outer encoder, particularly if the header outer encoder is an RS encoder. Symbol interleaving also reduces the effect of burst errors that are inherent in convolution coding and decoding.

The interleaved, outer encoded header and payload codewords are inner FEC encoded by the inner encoder 77. While various types of encoders can be used, preferably, the inner encoder is a turbo encoder, such as a serial, parallel or hybrid concatenated convolution (SCCC, PCCC or HCCC) coder. Alternative encoders are convolutional, block and trellis encoders. If chosen, the SCCC, PCCC or HCCC may be punctured, depending upon the requirements of the link. The resulting concatenated coded, interleaved data packets are modulated by the modulator 79. The output of the modulator 79 is applied to the antenna 81 of the ground terminal 61.

The antenna 81 of the ground station 61 transmits the modulated, concatenated coded, interleaved, data packets to the antenna 83 of the receiving satellite 63 via an uplink data channel.

In addition to the antenna 83, the receiving satellite 63 includes a demodulator 85, an inner decoder 87, a header and payload de-interleaver 88, a header de-interleaver 89, a payload de-interleaver 90, and a header outer decoder 91. The received modulated, concatenated coded, interleaved data packets are first demodulated by the demodulator 85. The demodulated data packets are decoded by the inner decoder 87 to recover the interleaved, outer encoded header and payload codewords. Depending upon the nature of the inner encoder 77 of the sending ground terminal 61, the inner decoder may be a turbo decoder or a viterbi decoder.

The header and payload de-interleaver 88 de-interleaves the symbols of the interleaved, outer encoded header and payload codewords. The header de-interleaver 89 then de-interleaves the symbols of the header codeword(s) and the payload de-interleaver 90 de-interleaves the symbols of the payload codeword(s). The outer encoded header symbols are decoded by the header outer decoder 91 to recover the original header data. The outer encoded payload codeword(s) remain encoded.

As described above, the header data is used to direct the outer encoded payload codeword(s) through the constellation of satellites to the satellite positioned to transmit the payload to the receiving ground terminal associated with the end user. In this regard, while, for ease of illustration, the header databits and the still outer encoded payload codeword(s) are depicted as separate outputs, it is to be understood that these data portions can, and most likely will be, reassembled into a continuous data string before being forwarded to another satellite in an actual embodiment of the invention. Alternatively, they may be maintained in separate, but related, queues as they transit the satellite network.

Figure 7:
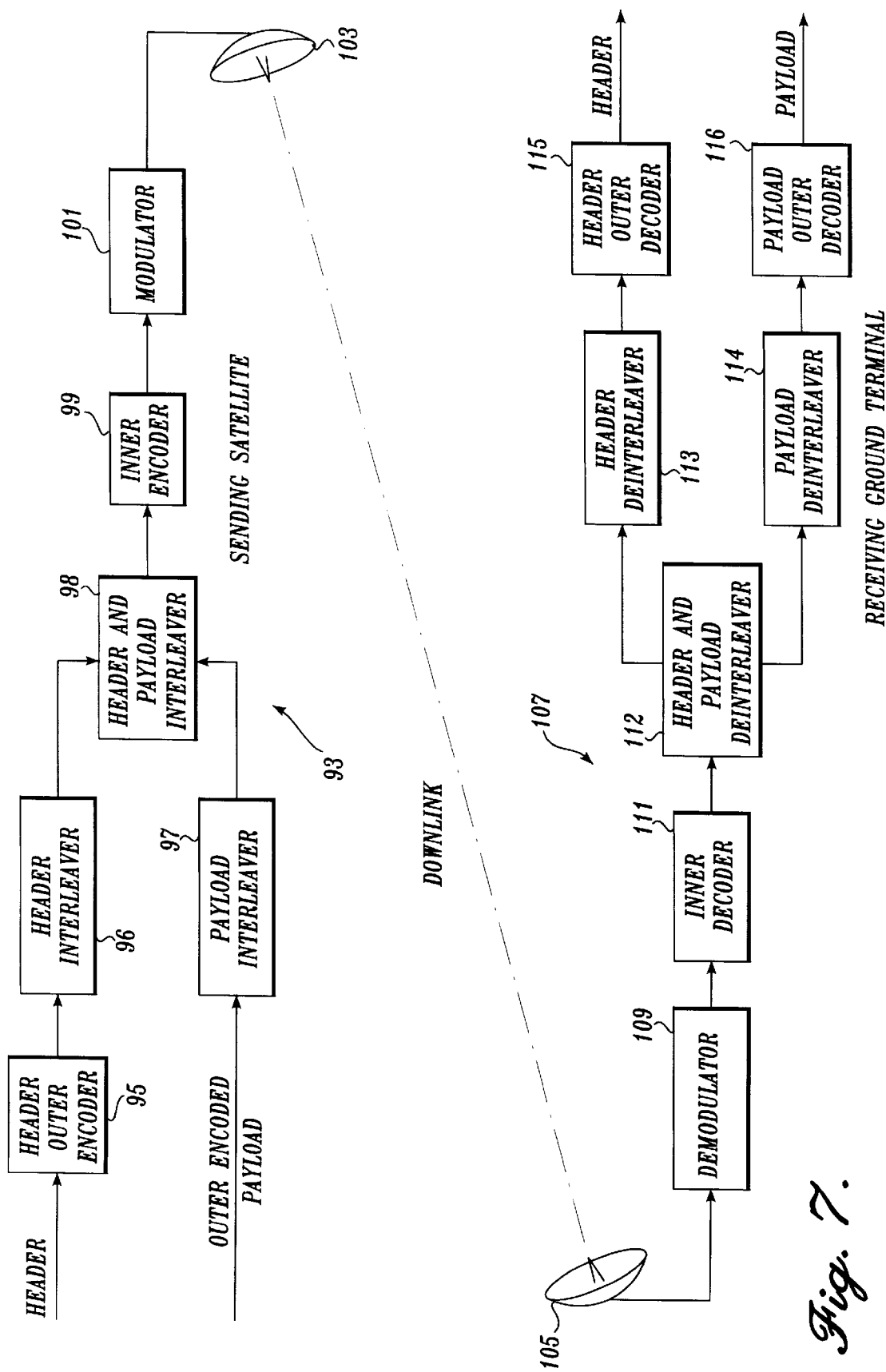
FIG. 7 is a functional block diagram that illustrates the downlink components of an LEO satellite data communication system formed in accordance with this invention.

As shown in FIG. 7, the sending satellite 93 includes a header outer encoder 95, a header interleaver 96, a payload interleaver 97, a header and payload interleaver 98, an inner encoder 99, a modulator 101, and an antenna 103. The header data is re-outer encoded by the header outer encoder 95. As before, the header outer encoder may be an RS or BCH encoder, for example. Obviously, the symbols of the outer encoded header codeword(s) must be compatible with the symbols of the still outer encoded payload codewords. The symbols of the still outer encoded payload codeword(s) and the re-outer encoded header codeword(s) are separately interleaved by the header and payload interleavers 96 and 97 and then interleaved together by the header and payload interleaver 98. The inner encoder 99 re-inner encodes the interleaved, re-outer encoded header and outer encoded payload codewords. As before, the presently preferred inner encoder 99 is a turbo encoder, such as a PCCC, SCCC or HCCC. Alternatively, the outer encoder may be a convolution, block or trellis encoder. Depending on the requirements of the link, the output may be punctured. The inner encoder 99 used on the downlink (FIG. 7) does not have to be the same as the inner encoder 71 used on the uplink (FIG. 6), although they may be the same. The re-concatenated coded, interleaved data packets are modulated by the modulator 101. The modulated, re-concatenated coded, interleaved data packets are applied to the antenna 103 of the sending satellite 93.

The antenna 103 of the sending satellite 93 transmits the modulated, re-concatenated coded, interleaved data packets to the antenna 105 of the receiving ground terminal 107 via a downlink data channel. In addition to the antenna 105, the receiving ground terminal 107 includes a demodulator 109, an inner decoder 111, a header and payload de-interleaver 112, a header de-interleaver 113, a payload de-interleaver 114, a header outer decoder 115, and a payload outer decoder 116

The received modulated, re-concatenated coded, interleaved data packets are demodulated by the demodulator 109. The inner decoder 111 decodes the re-concatenated coded, interleaved data packets to recover the interleaved, outer re-encoded header and outer encoded payload codewords. The symbols of the interleaved, re-outer encoded header and outer encoded payload codewords are first de-interleaved by the header and payload de-interleaver 112 to produce the separately interleaved header and payload codewords. The symbols of the interleaved header codeword(s) are de-interleaved by the header de-interleaver 113 and the interleaved symbols of the payload codeword(s) are de-interleaved by the payload de-interleaver 114. The outer re-encoded header codeword(s) are decoded by the header outer decoder 115, and the outer encoded payload codeword(s) are decoded by the payload outer decoder 116, resulting in the recovery of the header and payload databits. The header databits are used to assemble the payload databits contained in a plurality of data packets in the appropriate order and direct the reassembled data to the end user designated in the header databits as the recipient of the transmitted data.

Figure 8:
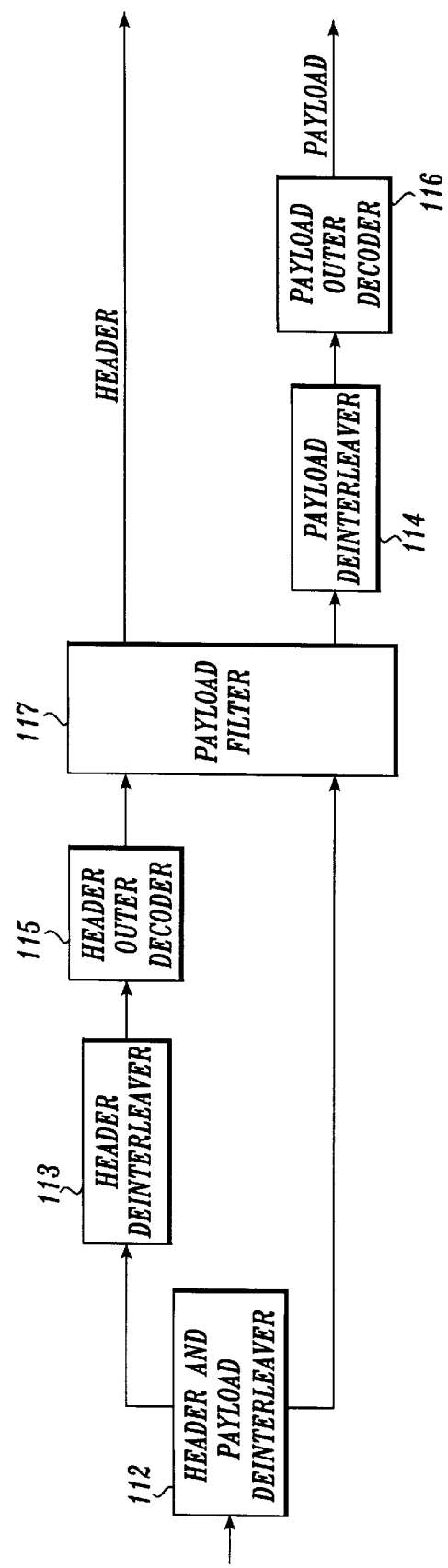
FIG. 8 is a functional block diagram of a portion of the receiving ground terminal of FIG. 7 modified to include a payload filter for removing all data packets not destined for the receiving ground terminal.
Figure 9:
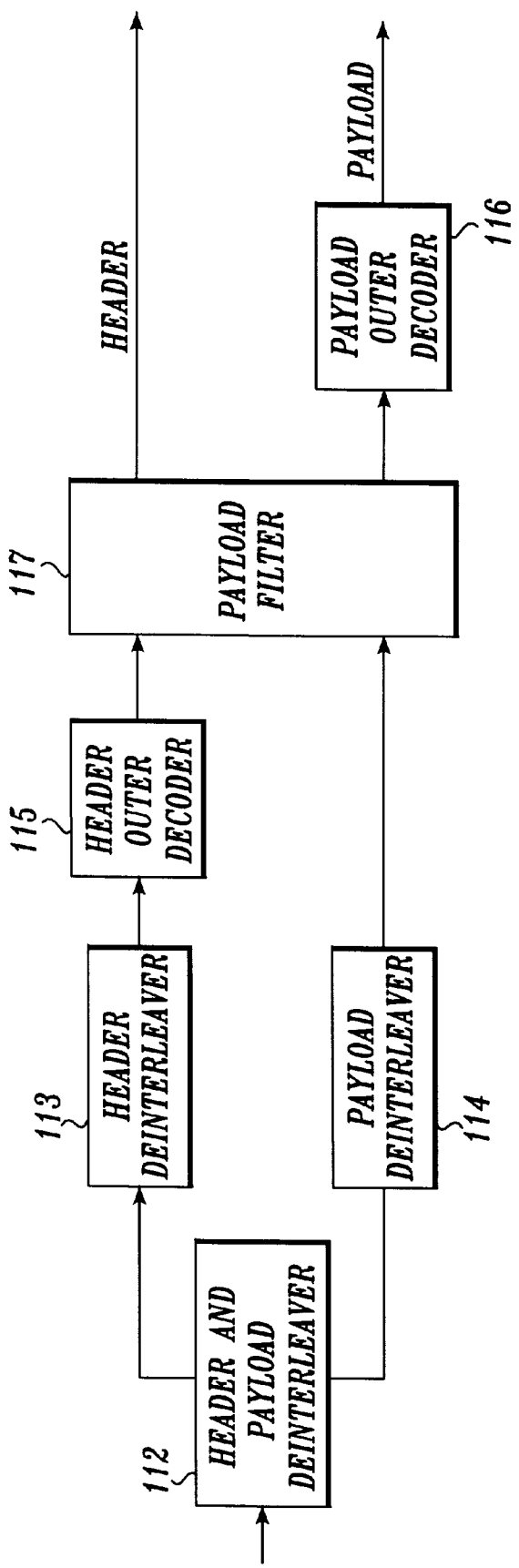
FIG. 9 is a functional block diagram of a portion of the receiving ground terminal in FIG. 7 also modified to include a payload filter for removing all data packets not destined for the receiving ground terminal.

FIGS. 8 and 9 are functional block diagrams of a portion of the receiving ground terminal of FIG. 7 modified to include a payload filter 117 for removing all data packets not destined for the receiving ground terminal. The payload filter is controlled by the output of the header outer decoder and in FIG. 8 controls the passage of the payload codewords to the payload de-interleaver 114 and the payload outer decoder 116. In FIG. 9, the payload filter 117 is located between the payload de-interleaver 114 and the payload outer decoder 116. If the decoded header databits do not identify the receiving ground terminal as a receiver of the payload information, the payload filter eliminates the payload codewords. The FIG. 8 version is used when the payload codewords are each derived from a single data packet and the FIG. 9 version is used when the payload codewords are each derived from several data packets. Thus, the only payload codewords whose symbols are decoded are those intended for the receiving ground terminal.

As will be readily appreciated by those skilled in the art and others, an LEO satellite data communication system formed in accordance with the invention has a number of advantages. Applying separate outer codes to the header and payload in an LEO satellite system of the type described above results in a system that allows separate bit error rate (BER) requirements to be applied to the payload and header. The BER requirements can differ because the payload requirement is end-to-end, while the header requirement is per link. The end-to-end requirement on the payload allows an end-to-end FEC encoding scheme to be used. The use of such a scheme reduces the coding gain required of each link. Because the header must be decoded per link, the possibility of end-to-end FEC encoding is eliminated. The use of a concatenated coding scheme allows both objectives to be met. In each link the header and payload can share the same inner code. Different outer codes can be applied to the payload and header of the data packets to meet differing requirements.

Figure 10:
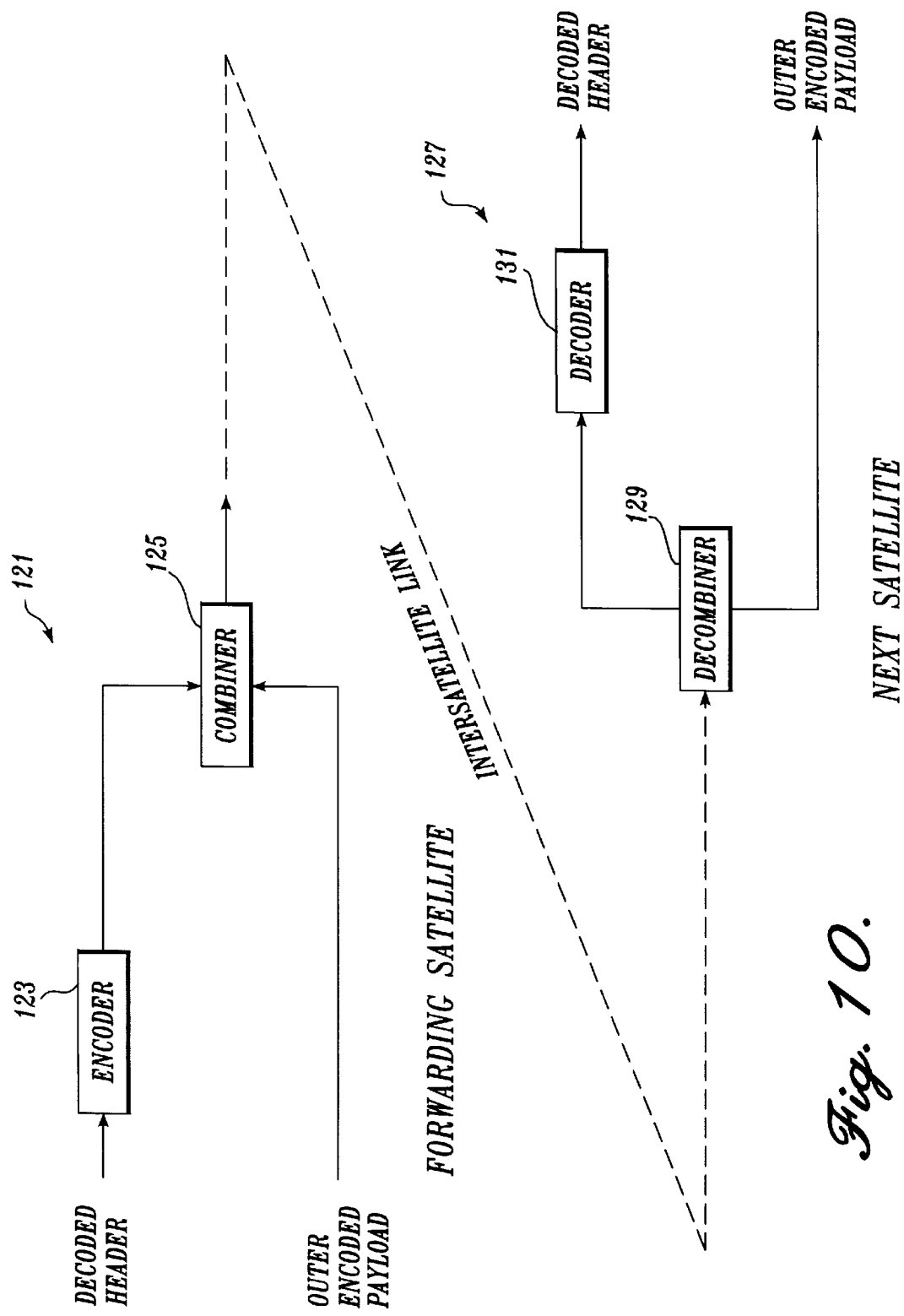
FIG. 10 is a functional block diagram that illustrates the interlink components of an LEO satellite data communication system formed in accordance with this invention.

While the header is decoded to obtain routing information at the receiving satellite, preferably, as shown in FIG. 10, the decoded header is re-encoded prior to data packets being forwarded from one satellite to another satellite. More specifically, as shown in FIG. 10, the forwarding satellite 121 includes an encoder 123 for re-encoding the decoded header and a combiner 125 for combining the re-encoded header with the outer encoded payload. The resulting data packet(s) is forwarded by an intersatellite link to the next satellite 127 in the route. The next satellite 127 includes a decombiner 129 for separating the re-encoded header from the outer encoded payload. The re-encoded payload is decoded by a decoder 131. As a result, both the header and the payload are forward error correction coded as the data packets are routed through the intersatellite links of the constellation of satellites.

While the preferred embodiment of the invention has been illustrated and described, it should be understood that various changes can be made therein. For example, while, for ease of illustration, the coding, interleaving, and decoding elements are depicted as discrete blocks in FIGS. 6 and 7, it is to be understood that the functions associated with the blocks can be carried out in various ways. The functions can be implemented in hardware, software, or a combination of hardware and software. As noted above, the number of header and payload databits can vary over a wide range and can contain information other than that shown in FIG. 5 and described above. Further, the uplink and downlink headers may be different from the intersatellite link header, depending upon the requirements of a particular system. Further, the intersatellite headers may be of different length than the uplink and downlink headers.

Moreover, it will be appreciated that the selection of the encoding scheme will depend on the errors introduced in the uplink intersatellite link and downlink data channels, as well as the acceptable bit error rate for the particular application. In some applications it may not be necessary to separately interleave the headers and payloads. In these applications the separate header and payload interleavers and de-interleavers may be omitted from the system. Further, the invention can be used with communication systems other than Earth-fixed cell satellite communication networks, including satellite-fixed antenna and other types of satellite communication systems. Hence, within the scope of the appended claims it is to be understood that the invention can be practiced otherwise than as specifically described herein.

The embodiments of the invention in which an exclusive property or privilege is claimed are defined as follows:

1. A data communication system for a communication network comprising a constellation of low-Earth orbit (LEO) satellites and ground terminals for sending data packets to and receiving data packets from the low-Earth orbit satellites forming said constellation, said data packets including header databits and payload databits, said header databits including information regarding the destination of the payload databits, said data communication system comprising:

a forward error correction (FEC) coding system located in said ground terminals for: (i) outer FEC encoding the header and payload databits of said data packets; (ii) interleaving the symbols of the resulting header and payload codewords; (iii) inner FEC encoding said interleaved, outer encoded header and payload codewords to produce concatenated coded, interleaved data packets; and (iv) transmitting said concatenated coded, interleaved data packets to one of said low-Earth orbit satellites;

an FEC decoding system located in said low-Earth orbit satellites for: (i) receiving said concatenated coded, interleaved data packets; (ii) decoding said concatenated coded, interleaved data packets to recover said interleaved, outer encoded header and payload codewords; (iii) de-interleaving the symbols of said interleaved, outer encoded header and payload codewords; and (iv) outer decoding said header codewords, but not said payload codewords, to recover said header databits;

an FEC coding system located in said low-Earth orbit satellites for: (i) receiving from other satellites data packets comprising header databits and outer encoded payload codewords; (ii) re-outer FEC encoding the header databits received from other satellites; (iii) interleaving the symbols of the resulting header codewords and said outer encoded payload codewords received from other satellites; (iv) re-inner FEC encoding said interleaved, re-outer encoded header and outer encoded payload codewords to produce re-concatenated coded, interleaved data packets; and (v) transmitting said re-concatenated coded, interleaved data packets to one of said ground terminals; and an FEC decoding system located in said ground terminals for: (i) receiving said re-concatenated coded, interleaved data packets; (ii) inner decoding said re-concatenated coded, interleaved data packets to recover said interleaved, re-outer encoded header and outer encoded payload codewords; (iii) de-interleaving said interleaved, re-outer encoded header and outer encoded payload codewords; and (iv) outer decoding said header and payload codewords to recover said header and payload databits.

2. A data communication system as claimed in claim 1, wherein said FEC coding system located in said ground terminals includes:

a header outer encoder for outer FEC encoding the header databits of said data packets to produce outer encoded header codewords;

a payload outer encoder for outer FEC encoding the payload databits of said data packets to produce outer encoded payload codewords;

an interleaver for interleaving the symbols of said outer encoded header and payload codewords; and an inner encoder for inner FEC encoding said interleaved, outer encoded header and payload codewords to produce said concatenated coded, interleaved data packets.

3. A data communication system as claimed in claim 2, wherein said ground terminal interleaver includes:

a header interleaver for separately interleaving the symbols of the outer encoded header codewords;

a payload interleaver for separately interleaving the symbols of the outer encoded payload codewords; and a header and payload interleaver for interleaving the separately interleaved symbols of the outer encoded header and payload codewords.

4. A data communication system as claimed in claim 2, wherein said FEC decoding system located in said low-Earth orbit satellites includes:

an inner decoder for decoding said concatenated coded, interleaved data packets to recover said interleaved, outer encoded header and payload codewords;

a de-interleaver for de-interleaving the symbols of said interleaved, outer encoded header and payload codewords; and a header outer decoder for outer decoding said outer encoded header databits.

5. A data communication system as claimed in claim 4, wherein:

(a) said ground terminal interleaver includes:
  (i) a header interleaver for separately interleaving the symbols of the outer encoded header codewords;
  (ii) a payload interleaver for separately interleaving the symbols of the outer encoded payload codewords; and
  (iii) a header and payload interleaver for interleaving the separately interleaved symbols of the outer encoded header and payload codewords; and (b) said satellite de-interleaver includes:
  (i) a header and payload de-interleaver for de-interleaving the separately interleaved symbols of the outer encoded header and payload codewords;
  (ii) a header de-interleaver for separately de-interleaving the symbols of the outer encoded header codewords; and
  (iii) a payload de-interleaver for separately de-interleaving the symbols of the outer encoded payload codewords.

6. A data communication system as claimed in claim 4, wherein said FEC coding system located in said low-Earth orbit satellites includes:

a header outer encoder for re-outer FEC encoding header data received from other satellites to produce re-outer encoded header codewords;

an interleaver for interleaving the symbols of said outer encoded payload codewords received from other satellites and the symbols of said re-outer encoded header codewords; and an inner encoder for re-inner FEC encoding said interleaved, re-outer encoded header and outer encoded payload codewords to produce said re-concatenated coded, interleaved data packets.

7. A data system communication system as claimed in claim 6, wherein:

(a) said ground terminal interleaver includes:
  (i) a header interleaver for separately interleaving the symbols of the outer encoded header codewords;
  (ii) a payload interleaver for separately interleaving the symbols of the outer encoded payload codewords; and
  (iii) a header and payload interleaver for interleaving the separately interleaved symbols of the outer encoded header and payload codewords;

(b) said satellite de-interleaver includes:
  (i) a header and payload de-interleaver for de-interleaving the separately interleaved symbols of the outer encoded header and payload codewords;
  (ii) a header de-interleaver for de-interleaving the separately interleaved symbols of the outer encoded codewords;
  (iii) a payload de-interleaver for de-interleaving the separately interleaved symbols of the outer encoded payload codewords; and (c) said satellite interleaver includes:

(i) a header interleaver for separately interleaving the symbols of the re-outer encoded header codewords;

(ii) a payload interleaver for separately interleaving the symbols of the outer encoded payload codewords; and (iii) a header and payload interleaver for interleaving the separately interleaved symbols of the re-outer encoded header codewords and the outer encoded payload codewords.

8. A data communication system as claimed in claim 6, wherein said FEC decoding system located in said ground terminals includes:

an inner decoder for decoding said re-concatenated coded, interleaved data packets to recover said interleaved, re-outer encoded header and outer encoded payload codewords;

a de-interleaver for de-interleaving the symbols of said interleaved, re-outer encoded header and outer encoded payload codewords;

a header outer decoder for outer decoding the re-outer encoded payload codewords to recover said databits; and a payload outer decoder for outer decoding said outer encoded payload codewords to recover said payload databits.

9. A data communication system as claimed in claim 8, wherein:

(a) said ground terminal interleaver includes:
(i) a header interleaver for separately interleaving the symbols of the outer encoded header codewords;
(ii) a payload interleaver for separately interleaving the symbols of the outer encoded payload codewords; and
(iii) a header and payload interleaver for interleaving the separately interleaved symbols of the outer encoded header and payload codewords;

(b) said satellite de-interleaver includes:
(i) a header and payload de-interleaver for de-interleaving the separately interleaved symbols of the outer encoded header and payload codewords;
(ii) a header de-interleaver for de-interleaving the separately interleaved symbols of the outer encoded header codewords; and
(iii) a payload de-interleaver for de-interleaving the separately interleaved symbols of the outer encoded payload codewords;

(c) said satellite interleaver includes:
(i) a header interleaver for separately interleaving the symbols of the re-outer encoded header codewords;
(ii) a payload interleaver for separately interleaving the symbols of the outer encoded payload codewords; and
(iii) a header and payload interleaver for interleaving the separately interleaved symbols of the re-outer encoded header codewords and the outer encoded payload codewords; and (d) said ground terminal de-interleaver includes:
(i) a header and payload de-interleaver for de-interleaving the separately interleaved symbols of the re-outer encoded header codewords and the outer encoded payload codewords;
(ii) a header de-interleaver for de-interleaving the separately interleaved symbols of the outer encoded header codewords; and
(iii) a payload de-interleaver for de-interleaving the separately interleaved symbols of the outer encoded payload codewords.

10. A data communication system as claimed in claim 8, wherein said ground terminals also include a payload filter for eliminating payload codewords not destined for a receiving ground terminal, whereby only payload codewords destined for a receiving ground station are decoded.

11. A data communication system as claimed in claim 1, wherein said low-Earth orbit satellites forward data packets from satellite to satellite via intersatellite links and wherein said low-Earth orbit satellites also include an intersatellite coding and decoding system for FEC intersatellite encoding of said recovered header databits prior to forwarding a data packet from one satellite to another satellite and for FEC decoding said intersatellite encoded header databits forwarded from one satellite to another satellite.

12. A data communication method for a communication network comprising a constellation of low-Earth orbit (LEO) satellites and a plurality of ground stations for transmitting data packets to and receiving data packets from said low-Earth orbit satellites forming said constellation, said data packets including header databits and payload databits, said header databits including information regarding the destination of the payload databits, said method comprising:

forward error correction (FEC) coding data packets to be transmitted by said ground terminals to one of said LEO satellites prior to transmission by: (i) outer FEC encoding the header and payload databits of said data packets; (ii) interleaving the symbols of the resulting header and payload codewords; and (iii) inner FEC encoding said interleaved, outer encoded header and payload codewords to produce concatenated coded, interleaved data packets;

transmitting said concatenated coded, interleaved data packets to one of said LEO satellites;

receiving said concatenated coded, interleaved data packets at one of said LEO satellites;

FEC decoding said concatenated coded, interleaved data packets at said one of said LEO satellites by: (i) inner decoding said concatenated coded, interleaved data packets to recover said interleaved, outer encoded header and payload codewords; (ii) de-interleaving the symbols of said interleaved, outer encoded header and payload codewords to recover said outer encoded header codewords and said outer encoded payload codewords; and (iii) outer decoding said outer encoded header codewords, but not said outer encoded payload codewords, to recover said header databits;

conveying said header databits and said outer encoded payload codewords through said constellation of LEO satellites to another of said LEO satellites;

FEC coding said header databits and said outer encoded payload codewords at said other satellite by: (i) re-outer encoding said header databits; (ii) interleaving the symbols of the resulting re-outer encoded header codewords and the symbols of said outer encoded payload codewords; and (iii) inner encoding said interleaved, re-outer encoded header and said outer encoded payload codewords to produce re-concatenated coded, interleaved data packets;

transmitting said re-concatenated coded, interleaved data packets to a ground terminal;

receiving said re-concatenated coded, interleaved data packets at a ground terminal; and FEC decoding said re-concatenated coded, interleaved data packets at said ground terminal by: (i) inner decoding said re-concatenated coded, interleaved data packets to recover said interleaved, re-outer encoded header and outer encoded payload codewords; (ii) de-interleaving the symbols of said interleaved outer re-encoded header and outer encoded payload codewords to recover said re-outer encoded header databits and said outer encoded payload codewords; (iii) outer decoding said re-outer encoded header codewords; and (iv) outer decoding said outer encoded payload codewords.

13. A data communication method as claimed in claim 12, wherein only outer encoded payload codewords destined for a receiving ground terminal are outer decoded at said receiving ground terminal.

14. A data communication method as claimed in claim 12, wherein said low-Earth orbit satellites forward data packets from satellite to satellite and wherein said method includes intersatellite FEC encoding said recovered header databits prior to forwarding data packets from one satellite to another satellite and decoding said intersatellite FEC encoded header databits forwarded from one satellite to another satellite.

15. In a data communication system wherein data packets that include header databits and payload databits are transmitted from a transmitting terminal to a receiving terminal via a plurality of satellites, the improvement comprising:
   an interleaver located at said transmitting terminal for interleaving the header databits with the payload databits; and
   a de-interleaver located at said receiving terminal for de-interleaving said interleaved header and payload databits.

16. The improvement claimed in claim 15, wherein:
   (a) the interleaver located at said transmitting terminal includes:
      (i) a header interleaver for separately interleaving header databits;
      (ii) a payload interleaver for separately interleaving payload databits; and
      (iii) a header and payload interleaver for interleaving the separately interleaved header with the separately interleaved payload databits; and
   (b) the de-interleaver located at said receiving terminal includes:
      (i) a header and payload de-interleaver for de-interleaving the separately interleaved header databits from the separately interleaved payload databits;
      (ii) a header de-interleaver for de-interleaving the separately interleaved header databits;
      (iii) a payload de-interleaver for de-interleaving the separately interleaved payload databits.

17. The improvement claimed in claim 15, also including:
   a de-interleaver located at the node receiving said data packets from said transmitting terminal for de-interleaving said header databits from said payload databits; and
   an interleaver located at the node forwarding data packets to said receiving terminal for interleaving said header databits with said payload databits.

18. The improvement claimed in claim 17, wherein:
   (a) said interleaver located at said transmitting terminal includes:
      (i) a header interleaver for separately interleaving header databits;
      (ii) a payload interleaver for separately interleaving payload databits; and
      (iii) a header and payload interleaver for interleaving the separately interleaved header with the separately interleaved payload databits;
   (b) said de-interleaver located at the node receiving said data packets from said transmitting terminal includes:
      (i) a header and payload de-interleaver for de-interleaving the separately interleaved header databits from the separately interleaved payload databits;
      (ii) a header de-interleaver for de-interleaving the separately interleaved header databits; and
      (iii) a payload de-interleaver for de-interleaving the separately interleaved payload databits;
   (c) said de-interleaver located at the node forwarding data packets to said receiving terminal includes:
      (i) a header interleaver for separately interleaving header databits;
      (ii) a payload interleaver for separately interleaving payload databits; and
      (iii) a header and payload interleaver for interleaving the separately interleaved header with the separately interleaved payload databits; and
   (d) said de-interleaver located at said receiving terminal includes:
      (i) a header and payload de-interleaver for de-interleaving the separately interleaved header databits from the separately interleaved payload databits;
      (ii) a header de-interleaver for de-interleaving the separately interleaved header databits; and
      (iii) a payload de-interleaver for de-interleaving the separately interleaved payload databits.

19. In a method of data communication wherein data packets that include header databits and payload databits are transmitted from a transmitting terminal to a receiving terminal via a plurality of satellites, the improvement comprising interleaving the header databits with the payload databits at the transmitting terminal and de-interleaving said interleaved header and payload databits at the receiving terminal.

20. The improved method claimed in claim 19, wherein:
   (a) interleaving the header and payload databits at the transmitting terminal includes:
      (i) separately interleaving header databits;
      (ii) separately interleaving payload databits; and,
      (iii) interleaving the separately interleaved header databits with the separately interleaved payload databits; and
   (b) de-interleaving said header and payload databits at the receiving terminal includes:
      (i) de-interleaving the separately interleaved header databits from the separately interleaved payload databits;
      (ii) de-interleaving the separately interleaved header databits; and
      (iii) de-interleaving the separately interleaved payload databits.

21. The improved method claimed in claim 20, also comprising de-interleaving said header databits from said payload databits at the node receiving data packets from said transmitting terminal and interleaving said header databits with said payload databits at the node forwarding data packets to said receiving terminal.

22. The improved method claimed in claim 21, wherein:
   (a) interleaving the header and payload databits at the transmitting terminal includes:
      (i) separately interleaving header databits;
      (ii) separately interleaving payload databits; and
      (iii) interleaving the separately interleaved header databits with the separately interleaved payload databits;

(b) de-interleaving said header and payload databits at the node receiving data packets from said transmitting terminal includes:
  (i) de-interleaving the separately interleaved header databits from the separately interleaved payload databits;
  (ii) de-interleaving the separately interleaved header databits; and
  (iii) de-interleaving the separately interleaved payload databits;

(c) interleaving said header and payload databits at the node forwarding data packets to said receiving terminal includes:
  (i) separately interleaving header databits;
  (ii) separately interleaving payload databits; and
  (iii) interleaving the separately interleaved header databits with the separately interleaved payload databits; and (d) de-interleaving said header and payload databits at the receiving terminal includes:
  (i) de-interleaving the separately interleaved header databits from the separately interleaved payload databits;
  (ii) de-interleaving the separately interleaved header databits; and
  (iii) de-interleaving the separately interleaved payload databits.

23. In a data communication system wherein data packets formed of header and payload databits that have been concatenated coded using inner and outer forward error correction (FEC) codes are transmitted from a transmitting terminal to a receiving terminal through a network of nodes by passing the data packets from node to node, the improvement comprising:

an inner FEC decoder located at the node receiving data packets from said transmitting terminal for inner FEC decoding said concatenated coded data packets;

an outer FEC decoder located at the node receiving data packets from said transmitting terminal for outer FEC decoding only said header databits, said payload databits remaining outer FEC encoded;

an outer FEC encoder located at the node forwarding data packets to said receiving terminal for re-outer FEC encoding said header databits; and an inner FEC encoder located at said node forwarding data packets to said receiving terminal for inner FEC encoding said re-outer encoded header databits and said outer encoded payload databits.

24. The improvement claimed in claim 23, including:
  an interleaver located at said transmitting terminal for interleaving said header and payload databits; and
  a de-interleaver located at said receiving terminal for de-interleaving said header and payload databits.

25. The improvement claimed in claim 23, also including:
  an interleaver located at said transmitting terminal for interleaving said header and payload databits; and
  a de-interleaver located at the node receiving data packets from said transmitting terminal for de-interleaving the header and payload databits; and
  an interleaver located at said node forwarding data packets to said receiving terminal for interleaving said re-outer encoded header databits and said outer encoded payload databits; and
  a de-interleaver located at said receiving terminal for de-interleaving said re-outer encoded header databits and said outer encoded payload databits.

26. In a method of data communication wherein data packets formed of header and payload databits that have been concatenated coded using inner and outer forward error correction (FEC) codes are transmitted from a transmitting terminal to a receiving terminal through a network of nodes by passing the data packets from node to node, the improvement comprising:

inner FEC decoding said concatenated coded data packets at the node receiving data packets from said transmitting terminal;

outer FEC decoding only said header databits at said node receiving data packets from said transmitting terminal;

re-outer FEC encoding said header databits at said node forwarding data packets to said receiving terminal; and re-inner encoding said re-outer encoded header databits and said outer encoded payload databits at said node forwarding said data packets to said receiving terminal.

27. The improved method claimed in claim 26, including interleaving the header and payload databits at the transmitting terminal and de-interleaving the header and payload databits at the receiving terminal.

28. The improved method claimed in claim 27, including interleaving the header and payload databits at the transmitting terminal, de-interleaving the header and payload databits at the node receiving data packets from said transmitting terminal, interleaving the re-outer encoded header databits and the outer encoded payload databits at the node forwarding data packets to the receiving terminal, and de-interleaving said re-outer encoded header databits and said outer encoded payload databits at said receiving terminal.

\* \* \* \* \*

UNITED STATES PATENT AND TRADEMARK OFFICE
CERTIFICATE OF CORRECTION

PATENT NO.   : 6,157,642
DATED        : December 5, 2000
INVENTOR(S)  : M.A. Sturza et al.

It is certified that error appears in the above-identified patent and that said Letters Patent is hereby corrected as shown below:

<u>Title page,</u>
Item [75], Inventors "Kirkland," should read -- Kirkland --.

Signed and Sealed this

Second Day of October, 2001

*Attest:*

*Attesting Officer*

NICHOLAS P. GODICI
*Acting Director of the United States Patent and Trademark Office*